US010980686B2

(12) United States Patent
Doring et al.

(10) Patent No.: US 10,980,686 B2
(45) Date of Patent: Apr. 20, 2021

(54) COLLAPSIBLE MOBILITY AID

(71) Applicant: OTTO BOCK MOBILITY SOLUTIONS GMBH, Konigsee-Rottenbach (DE)

(72) Inventors: Florian Doring, Weimar (DE); Dmitrij Hildebrand, Bad Herrenalb (DE); Christof Meier, Uttenreuth (DE)

(73) Assignee: OTTO BOCK MOBILITY SOLUTIONS GMBH, Konigsee-Rottenbach (DE)

( * ) Notice: Subject to any disclaimer, the term of this patent is extended or adjusted under 35 U.S.C. 154(b) by 240 days.

(21) Appl. No.: 16/098,364

(22) PCT Filed: Apr. 26, 2017

(86) PCT No.: PCT/EP2017/059913
§ 371 (c)(1),
(2) Date: Nov. 1, 2018

(87) PCT Pub. No.: WO2017/191004
PCT Pub. Date: Nov. 9, 2017

(65) Prior Publication Data

US 2019/0142662 A1 May 16, 2019

(30) Foreign Application Priority Data

May 2, 2016 (DE) ..................... 10 2016 108 150.7
May 26, 2016 (DE) ..................... 10 2016 109 759.4

(51) Int. Cl.
*B62B 1/00* (2006.01)
*A61G 5/08* (2006.01)
*A61H 3/04* (2006.01)

(52) U.S. Cl.
CPC .......... *A61G 5/0825* (2016.11); *A61G 5/0816* (2016.11); *A61G 5/0883* (2016.11); *A61H 3/04* (2013.01)

(58) Field of Classification Search
CPC .. A61G 5/0825; A61G 5/0816; A61G 5/0883; A61G 5/08; A61G 5/00; A61G 5/0808; A61H 3/04
See application file for complete search history.

(56) References Cited

U.S. PATENT DOCUMENTS 2,896,693 A * 7/1959 Schladebach ............ A61G 5/08 280/42
4,077,640 A * 3/1978 Perego ...................... B62B 7/08 280/42
(Continued)

FOREIGN PATENT DOCUMENTS

CN 103781673 A 5/2014
DE 10133340 A1 1/2003
(Continued)

OTHER PUBLICATIONS

PCT International Search Report for PCT International Patent Application No. PCT/EPP2017/059913, dated Jul. 24, 2017.

*Primary Examiner* — James M Dolak
(74) *Attorney, Agent, or Firm* — Holland & Hart LLP

(57) ABSTRACT

A collapsible mobility aid with two frame elements, on each of which at least one wheel is secured or can be secured, and with a folding mechanism by which the frame elements are connected to each other, and a distance between the frame elements in a first position of the folding mechanism can be adapted to a transport distance and in a second position of the folding mechanism can be adapted to a use distance, wherein the folding mechanism has a central element with a slide arranged moveably with respect thereto, at least two connection arms which are each articulated on a frame
(Continued)

element and on the central element, and at least two levers which are each articulated on a connection arm and on the slide, wherein the swivel axes, about which the levers are arranged on the connection arms and the slide such that they can be swiveled, are on one plane when the folding mechanism is in the second position.

19 Claims, 7 Drawing Sheets

(56) References Cited

U.S. PATENT DOCUMENTS

| | | | | |
|---|---|---|---|---|
| 4,358,125 | A * | 11/1982 | Charles | A61G 5/128 280/250.1 |
| 4,595,212 | A * | 6/1986 | Haury | A61G 5/00 280/250.1 |
| 4,635,955 | A | 1/1987 | Zoor | |
| 4,712,830 | A | 12/1987 | Charbrol et al. | |
| 4,741,547 | A | 5/1988 | Tholkes | |
| 5,076,390 | A * | 12/1991 | Haskins | A61G 5/08 280/250.1 |
| 5,782,483 | A | 7/1998 | Rogers et al. | |
| 6,386,575 | B1 * | 5/2002 | Turner | B62B 7/06 280/647 |
| 6,467,788 | B1 | 10/2002 | Li et al. | |
| 6,572,133 | B1 | 6/2003 | Stevens | |
| 7,607,724 | B2 * | 10/2009 | Dickie | B62B 7/06 297/16.1 |
| 7,607,725 | B2 * | 10/2009 | Dickie | B62B 7/10 297/45 |
| 7,988,171 | B2 * | 8/2011 | Chong | A61G 5/0883 280/250.1 |
| 8,419,047 | B2 | 4/2013 | Chen | |
| 8,454,048 | B1 * | 6/2013 | Regan | A61G 5/0825 280/649 |
| 9,375,370 | B2 * | 6/2016 | Horacek | A61G 5/0883 |
| 9,642,756 | B2 * | 5/2017 | Lauret | A61G 5/08 |
| 9,655,794 | B2 * | 5/2017 | Bednarz, III | A61G 5/0816 |
| 9,795,525 | B2 * | 10/2017 | Lauret | A61G 5/0883 |
| 10,064,769 | B2 * | 9/2018 | Thompson | A61G 5/08 |
| 10,123,922 | B2 * | 11/2018 | Gingras | A61G 5/10 |
| 10,501,104 | B2 * | 12/2019 | Simmons | B60B 37/10 |
| 10,555,866 | B2 * | 2/2020 | Pan | A61H 3/04 |
| 2012/0018982 | A1 | 1/2012 | Chen | |
| 2015/0245963 | A1 | 9/2015 | Lauret et al. | |

FOREIGN PATENT DOCUMENTS

| | | |
|---|---|---|
| GB | 753894 | 8/1956 |
| GB | 2101540 A | 1/1983 |
| GB | 2125740 A | 3/1984 |
| WO | 2015034372 A1 | 3/2015 |

* cited by examiner

COLLAPSIBLE MOBILITY AID

TECHNICAL FIELD

The invention relates to a collapsible mobility aid with two frame elements, on each of which at least one wheel is secured or can be secured, and with a folding mechanism by which the frame elements are connected to each other, and a distance between the frame elements in a first position of the folding mechanism can be adapted to a transport distance and in a second position of the folding mechanism can be adapted to a use distance, wherein the folding mechanism has a central element with a slide arranged moveably with respect thereto, at least two connection arms which are each articulated on a frame element and on the central element, and at least two levers which are each articulated on a connection arm and on the slide.

BACKGROUND

Mobility aids within the meaning of the present invention are orthopaedic devices for people of limited mobility. For instance, mobility aids may be wheelchairs, walking aids or walking frames, or buggies or other devices and equipment which increase mobility. This type of device, and in particular collapsible wheelchairs, have been known within the scope of the prior art for many years. For example, U.S. Pat. No. 8,419,047 B2 and WO 2015/034372 A1 both describe such a collapsible wheelchair. The aim of the folding mechanism is to reduce the distance between the two frame elements for the purpose of transporting the wheelchair. This enables space-saving storage of the wheelchair when transporting it.

A wheelchair according to the preamble is described, for instance, in US 2015/0245963 A1. While the two formerly named documents comprise a folding mechanism in the form of connection arms that are only fixed in pairs to the two frame elements, wherein a simple hinge with an end stop is arranged between each of the arms, the latter named application features a folding mechanism as described in the present disclosure. The advantage is the two levers, which are each arranged between a connection arm and the slide of the central element. As a result, when the collapsible wheelchair is folded up, i.e. when the folding mechanism moves from the second position into the first position, the folding-up or—in the reverse process—the unfolding of the folding mechanism on both sides, i.e. towards the two frame elements, is guaranteed to be quick and homogeneous.

There is a risk with collapsible mobility aids that the mobility aid will be involuntarily folded up, for example accidentally, although the intention was not to do so. In principle, a seat cushion or seat cover is situated between the two frame elements; the user of the mobility aid then sits on this cushion or cover. As a result, a force acts on the two frame elements that are connected to this cover or cushion, wherein this force is aimed towards the respective other frame element; this may lead to the folding mechanism moving out of the second position into the first position, although this is not desirable in this situation. US 2015/0245962 A1 solves this problem by moving the folding mechanism a little beyond the dead centre of the folding mechanism when the folding mechanism is brought out of the first position into the second position, i.e. when unfolding the folding mechanism. As such, a pressure on the two frame elements of the wheelchair cannot cause the collapsible wheelchair to be unintentionally folded up. However, on the one hand, it is disadvantageous that, in order to fold up the folding mechanism, i.e. to move the folding mechanism out of the second position into the first position, the two frame elements must first of all be moved away from each other so as to once again move the folding mechanism beyond the dead centre. On the other hand, it is disadvantageous that the movement of the folding mechanism beyond the dead centre causes a bearing gap within the system, which may lead to a rattling and a general sense of insecurity, as well as the feeling that the wheelchair is of sub-standard quality, although objectively speaking this is not the case.

U.S. Pat. No. 6,572,133 B1 describes another configuration of a folding mechanism which, when fully unfolded, i.e. in the second position of the folding mechanism, is far from the dead centre of the arrangement. When fully unfolded, the respective connection arms of the folding mechanism therefore do not run exactly or almost exactly perpendicular on the longitudinal extension of the central element; rather, they are each at a considerable angle, which may lie between 40° and 45° in the named document. In this case, different connection arms are provided which are at a corresponding angle in different directions, as is known from a scissors mechanism. Consequently, a pressure on the two frame elements would cause this folding mechanism to push together, wherein the connection arms that are, for example, tilted backwards in terms of the direction of movement of the wheelchair, are arranged on the slide of the central element, while the connection arms that are swiveled forwards in terms of the direction of the wheelchair are positioned on the central element itself. A folding-up of the folding mechanism by applying pressure to the frame elements would therefore cause a movement of the slide relative to the central element. However, since these two components are fixed against one another when the folding mechanism is fully unfolded, i.e. in the second position, this movement is not possible. However, the embodiment depicted has the disadvantage that it requires a large number of connection arms; moreover, the folding mechanism is complex and therefore expensive.

SUMMARY

Therefore, the invention aims to further develop a collapsible mobility aid according to the present disclosure such that a rattling and sense of insecurity can be definitively avoided, the folding mechanism is simple and thus cost-effective to produce, and as low a transport distance as possible is also achieved.

The invention solves the proposed task by way of a collapsible mobility aid according to the present disclosure, which is characterised by the fact that the swivel axes, about which the levers are arranged on the connection arms and the slide such that they can be swivelled, are on one plane when the folding mechanism is in the second position.

This means that the arrangement is precisely at its dead centre, meaning that a pressure on one or both of the frame elements acting towards the respective other frame element does not cause the folding mechanism to fold up, thereby fixing the collapsible mobility aid and its folding mechanism. This also guarantees that, in the second position of the folding mechanism, the distance between the two frame elements is the maximum possible distance that can be achieved with the respective folding mechanism. By moving the folding mechanism beyond the dead centre, as is known from the prior art, the distance between the two frame elements when the dead centre is exceeded once again decreases from its maximum value. This produces a bearing gap in the system, which may lead to a rattling and a sense of insecurity, and the feeling that the mobility aid is of sub-standard quality. The arrangement according to the invention avoids this situation.

The swivel axes, about which the levers are arranged on the connection arms and the slide such that they can be swiveled, are preferably on one plane when the folding mechanism is in the second position. The fact that the connection arms are also in their dead position or at their dead centre supports the self-fixing of the folding mechanism of the collapsible mobility aid. Of course, in this case it is not necessary for the plane on which the swivel axes—about which the connection arms can be swiveled—are situated to be the same plane as the arms, in which the swivel axes are situated, in order to allow the levers to be swiveled. Generally speaking, this is not possible and is also not necessary for the functionality of the collapsible mobility aid. The only important aspect is that, when the folding mechanism is in the second position, i.e. when the mobility aid is unfolded, the swivel axis, about which the levers can be swiveled, are on one plane and the swivel axis, about which the swivel arms can be swiveled, are on another separate plane.

The folding mechanism is preferably pre-tensioned towards the second position, in particular by means of a spring element that is spring-loaded. This guarantees that, even in the event that the dead centre of the respective swivel movement of the lever and/or the connection arm is not fully reached, the folding mechanism will definitely not inadvertently fold up. The strength of the applied pre-tension force, for example the strength of the spring used, can be used to define how much force is to be applied, even when the dead centre is not reached, in order to bring the folding mechanism out of the second position into the first position and thereby fold up the collapsible mobility aid.

The spring element is preferably arranged in such a way that it is tensioned when the folding mechanism is brought out of the second position into the first position. Consequently, this occurs when the folding mechanism and the collapsible mobility aid are folded up. The energy that is stored in the spring can be used, for example, during a subsequent unfolding of the folding mechanism and the collapsible mobility aid by, for instance, releasing a catch.

The folding mechanism can preferably be locked in the first position by a locking device. The locking device may be formed of a locking element, such as a latch element, which automatically latches into the locking position as soon as the first position of the folding mechanism is reached. To move the folding mechanism out of the second position into the first position, the slide of the central element must be pulled, for example, or a compressive force applied to it. As soon as the slide has then reached the position in which the folding mechanism is in the first position, a latch element can be automatically activated, which engages with a latch recess or a latch undercut that is specifically designed for this purpose. Of course, other locking elements that lock automatically are conceivable.

In an alternative solution, the locking device may be activated manually as soon as the folding mechanism is in the first position. This device may be designed to be a lever, a retractable bolt or a button that must be activated.

It has been proven to be advantageous if the folding mechanism can be brought out of the first position into the second position by releasing the locking device. This means that it is not necessary to apply a force on the frame elements, for instance, in order to pull them apart. In this case, the force required is preferably supplied by the energy stored in the spring element.

Alternatively or additionally, it is also possible that the folding mechanism fixes and locks itself in the first position by, for instance, the lever being in a dead centre position. In this case, it may be practical to provide a transport safety device or safety device which prevents an inadvertent unfolding of the mobility aid, which would happen if the folding mechanism were to be inadvertently brought out of this dead centre position. This type of safety device may be a safety strap which, for example, is fixed to frame elements of the mobility aid by means of velcro or press studs.

In a preferred configuration, an end stop is situated on the outer end of at least one of the connection arms, but preferably on all connection arms. The frame element fits closely on this end stop when the folding mechanism is in the second position. In order to enable a backlash-free adjustment, it is advantageous if the end stop is adjustable. In this case, the end stop element on which the respective frame element fits closely when the folding mechanism is in the second position is, for instance, configured such that it can be moved relative to the respective connection arm.

The central element preferably features an end stop on which the slide fits closely when the folding mechanism is in the second position. As a result, it is especially easy to ensure that the slide can only be moved as far as the point at which the folding mechanism arrives at the second position and not beyond. At the same time, it guarantees that the slide is moved at least as far as the point at which the folding mechanism arrives at the second position. This almost completely rules out the possibility of incorrect operation. In an especially advantageous configuration, latch elements are provided on the slide and/or on the end stop, which engage with one another or in the recesses provided as soon as the slide is on the end stop and the folding mechanism is in the second position. It is thus particularly easy and safe to guarantee an exact positioning.

The slide preferably comprises a grip element. This can be used to apply the required tensile or compressive force to the slide so as to bring the folding mechanism out of the second position into the first position. If it is necessary to also apply a force for the reverse process, this can also be applied to the grip element.

The folding mechanism preferably has at least four connection arms, two of which are connected to each of the frame elements and two of which are connected to the central element. In this case, it is not necessary for a lever to also be arranged on each of the at least four connection arms. In particular, the levers ensure that the movement of the two frame elements, which are moved towards the central element when the folding mechanism is moved out of the second position into the first position, is synchronised on both sides. This is achieved by the levers regardless of whether such a lever is arranged on each of the at least four connection arms. However, it is of course possible to provide a corresponding lever on each of the connection pairs.

In a preferred configuration of the invention, the swivel movement of the connection arms about the swivel axes occurs on different planes. In this case, the individual swivel movements of the connection arms may be identical on a pair-by-pair basis, especially for the connection arms which lie opposite one another on the central element and are connected to different frame elements. As a result of the swivel movements on different planes of, for example, two connection arms that lie on the same side of the central element and are connected to the same frame element, the frame elements will lie on top of each other as soon as the folding mechanism is in the first position. Therefore they do not interfere with one another when stored and it is thus possible to achieve a smaller transport distance.

BRIEF DESCRIPTION OF THE DRAWINGS

In the following, an example of an embodiment of the present invention will be explained in more detail by way of the attached figures: They show.

DETAILED DESCRIPTION

Figure 1:
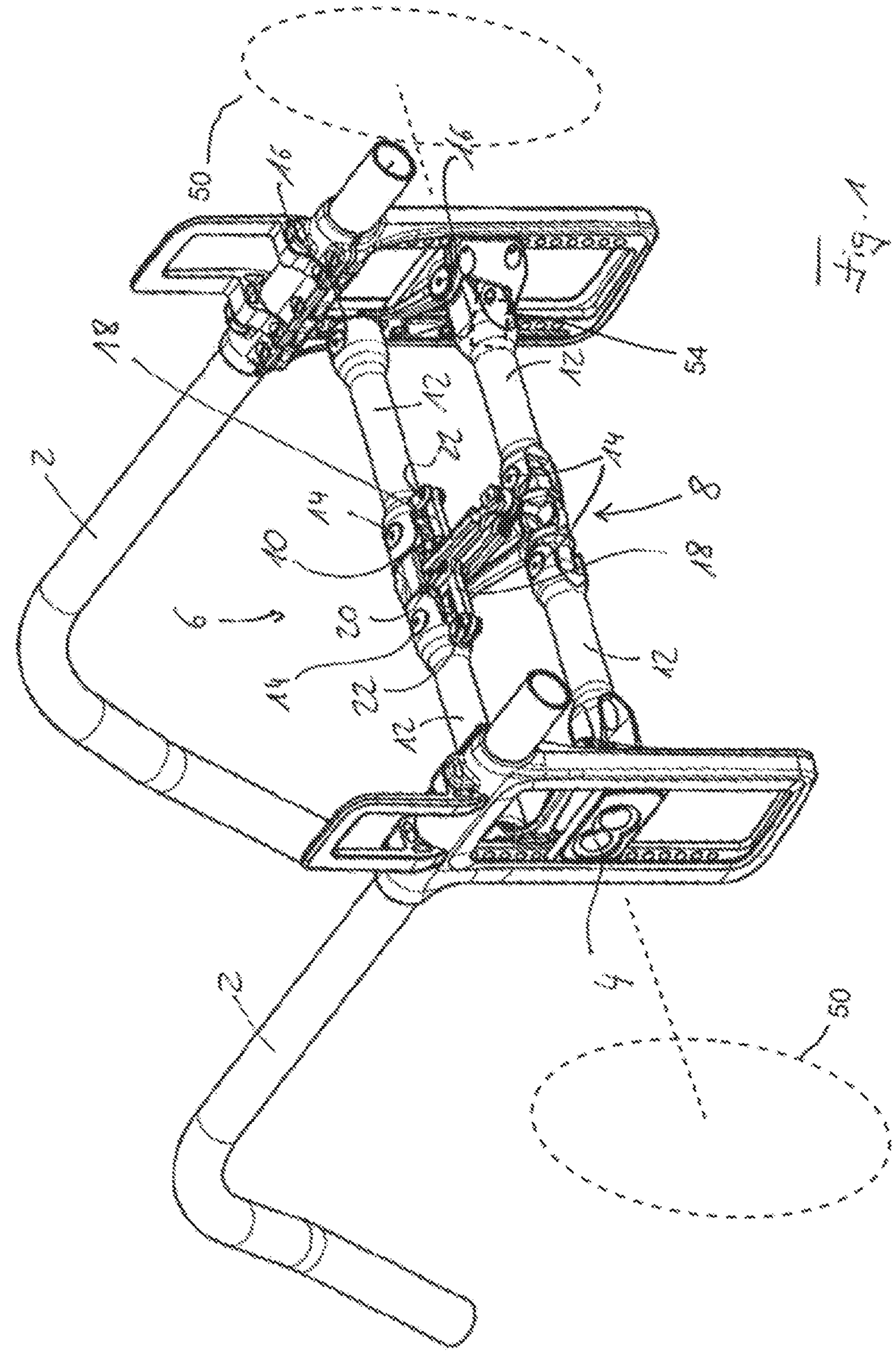
FIG. 1—a schematic three-dimensional view of a part of a mobility aid.

FIG. 1 shows a schematic three-dimensional view of a part of a mobility aid. Two frame elements 2 are visible which feature hollow axes 4, into which the axes or hubs of a wheel 50 of a mobility aid can be inserted. A folding mechanism 6 is situated between the two frame elements 2, the folding mechanism comprising a central element 8 on which a slide 10 is situated. Four connection arms 12 are situated on the central element 8, these arms each being arranged on the central element 8 by way of a first arm swivel axis 14 and on the respective frame element 2 by way of a second arm swivel axis 16 and adjustable end stops 54.

Figure 5B:
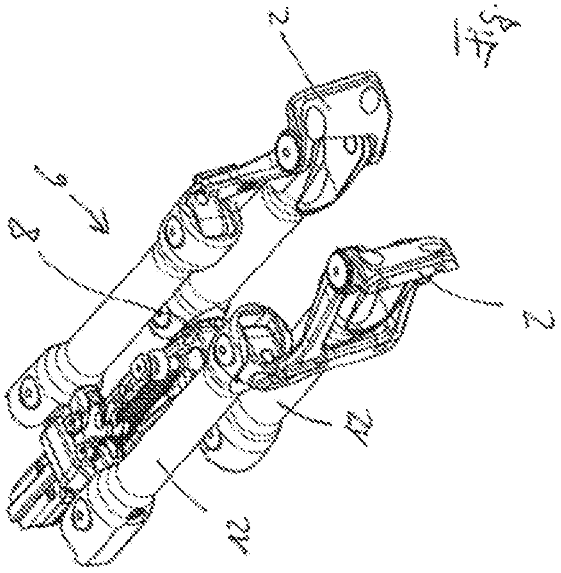
Figure 5A:
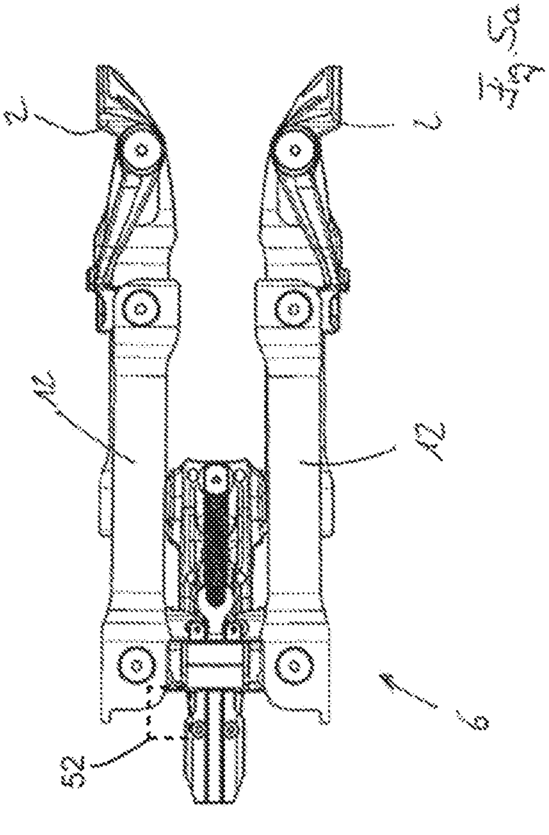

In FIG. 1 it should also be noted that two levers 18 are each fixed to one of the connection arms 12 and to the central element 8. They are each fixed on the central element 8 such that they can be swiveled by way of a first lever swivel axis 20 and are each connected to the central element 8 by way of a second lever swivel axis 22. It can also be recognised in FIG. 1 that a total of four connection arms 12 are provided, which can be divided into two front and two rear connection arms. The front and rear connection arms are articulated at different "heights" on the central element 8. As can also be seen in FIGS. 5*a* and 5*b* for instance, this causes the swivel movement of the front and rear connection arms to occur on different planes so they do not obstruct each other when the folding mechanism is in the first position, as depicted in FIGS. 5*a* and 5*b*. When unfolded, as shown in FIG. 1, the four connection arms span one plane. This plane preferably intersects the plane of the wheelchair or another configured mobility aid in the front third of its seating surface. This reinforces the stability and the sense of safety for the user of the mobility aid.

Figure 2B:
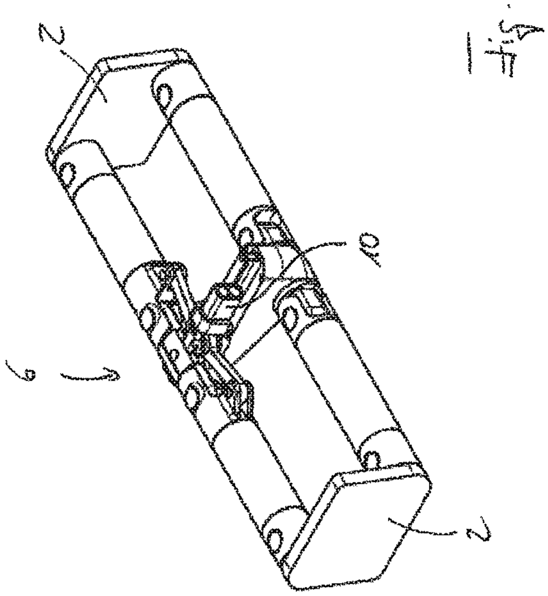
FIGS. 2*a* and 2*b*—a schematic top view and a schematic three-dimensional view of a fully unfolded folding mechanism, FIGS. 3*a* and 3*b*—the depictions from FIGS. 2*a* and 2*b* when slightly folded, FIGS. 4*a* and 4*b*—the depictions from FIGS. 2*a* and 2*b* when folded to a considerable degree, FIGS. 5*a* and 5*b*—the depictions from FIGS. 2*a* and 2*b* when fully folded, FIG. 6—an enlarged section of a folding mechanism and FIG. 7—the schematic depiction of a part of a mobility aid.
Figure 2A:
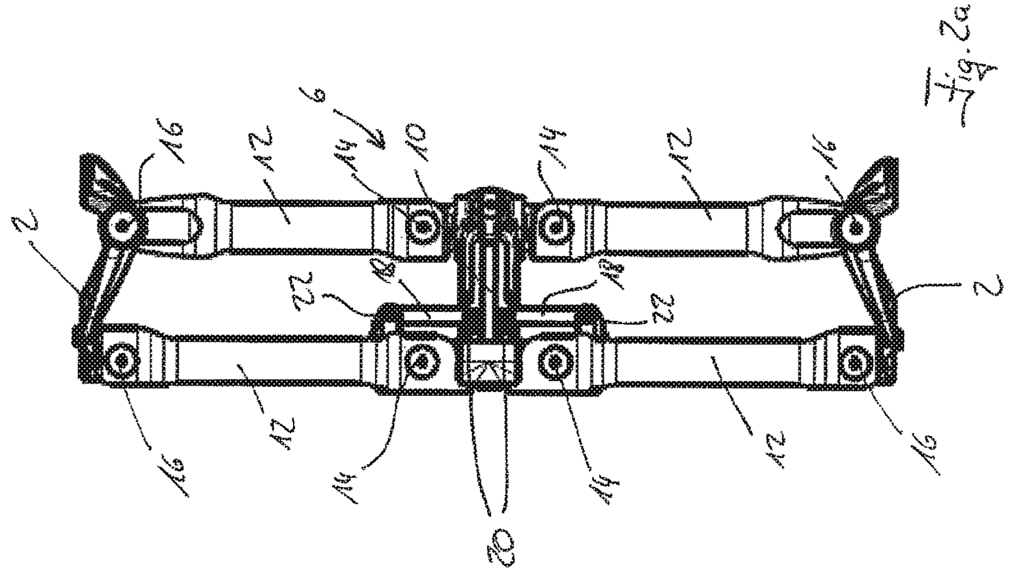
Figure 3B:
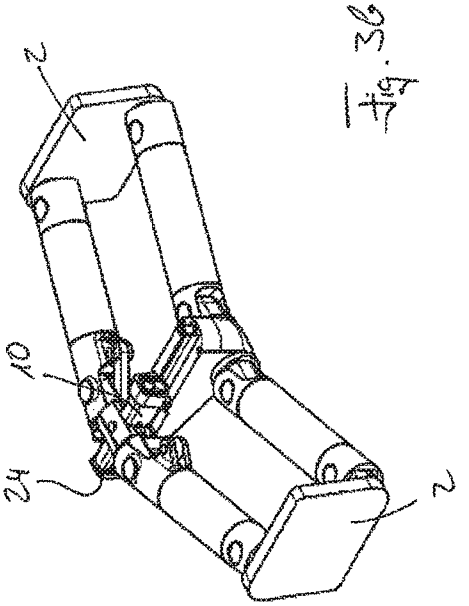
Figure 3A:
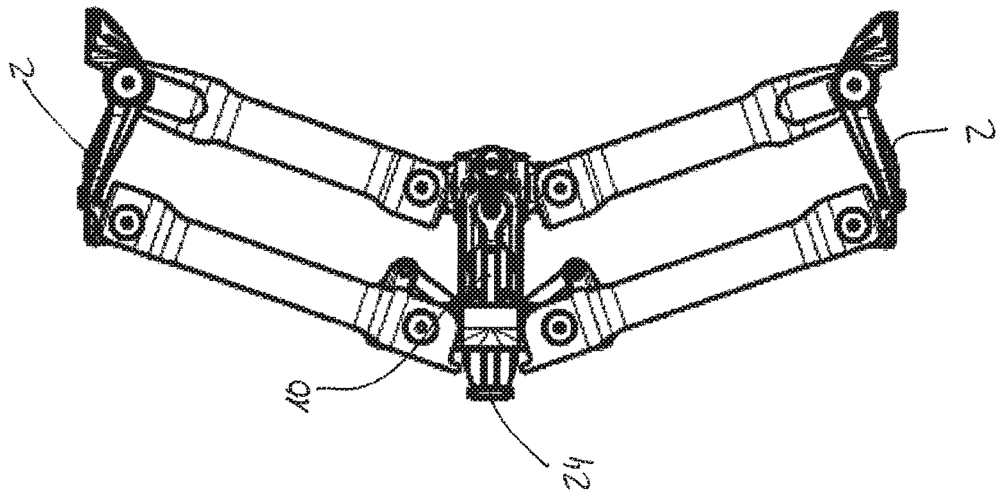
Figure 4B:
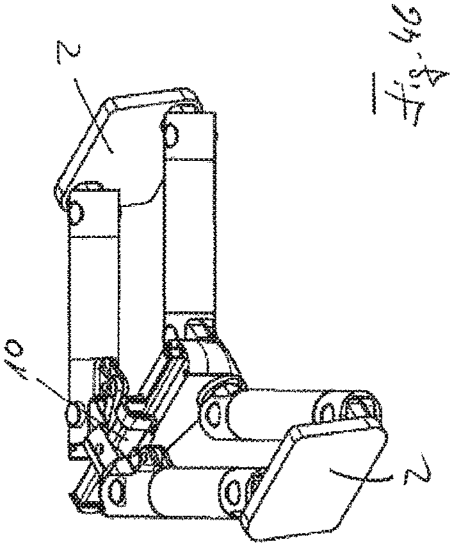
Figure 4A:
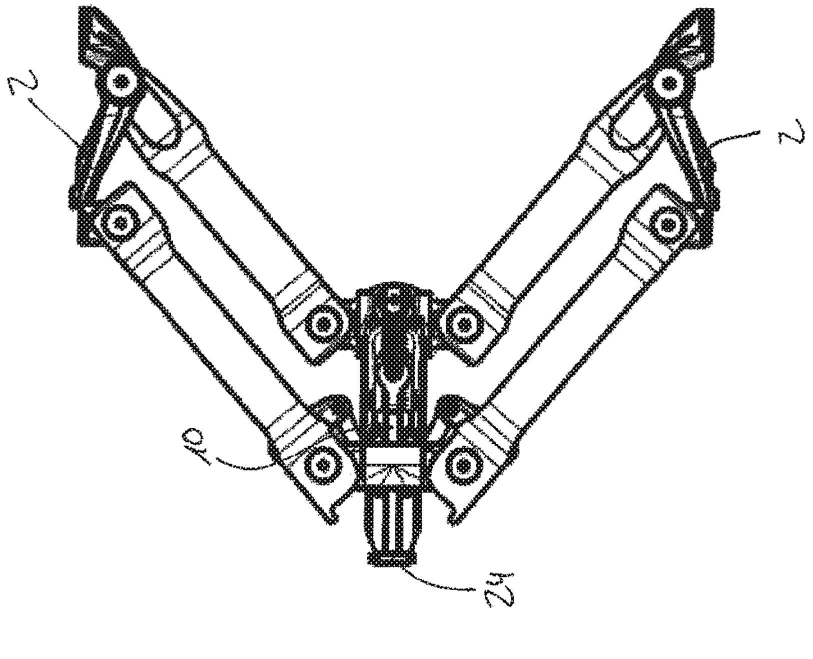

FIG. 2*a* shows a schematic top view of a folding mechanism 6, while FIG. 2*b* shows the schematic 3D view of the folding mechanism 6. In both FIG. 2*a* and FIG. 2*b*, the folding mechanism is in the second position, i.e. fully unfolded. The distance between the two frame elements 2 is at its maximum with the selected folding mechanism 6 and thus corresponds to the use distance. In FIG. 2*a*, it can be recognised that both the first arm swivel axes 14 and the second arm swivel axes 16 for two connection arms 12 that face one another lie on one plane, i.e. in one line. The same applies for the first lever swivel axes 20 and the second lever swivel axes 22, even if this is not especially clear from the geometric shape of the depicted lever 18.

The slide 10, which is particularly clear in FIG. 2*b*, is in the position in which it has been moved backwards as far as possible, wherein in the left-hand area of FIG. 2*a*, it is at the front in the direction of motion of the mobility aid.

FIGS. 3*a* and 3*b*, and 4*a* and 4*b*, show the depiction from FIGS. 2*a* and 2*b* when it is slightly folded and folded to a considerable degree. The further the folding process progresses, the further to the left the slide 10 is moved. A grip element 24 is located in the frontal area of the slide 10; a pulling element, such as a string or a cord, may be arranged on this grip element.

In FIGS. 5*a* and 5*b*, the depicted folding mechanism 6 is fully folded up, i.e. it is shown in the first position. The distance between the two frame elements 2 is minimal and thus corresponds to the transport distance. In FIG. 5*b* in particular it is clear that the swivel movements of the two connection arms 12, which are arranged on the same side of the central element 8, have been executed on different planes. In the example of an embodiment depicted, the connection arms 12 are arranged below each other. This ensures that, in the first position of the folding mechanism as shown in FIGS. 5*a* and 5*b*, they are also arranged on top of each other and therefore do not obstruct each other during folding. This enables a smaller transport distance. The first position may be maintained with a locking device 52 that is automatically or manually actuated when the folding mechanism reaches the first position.

Figure 6:
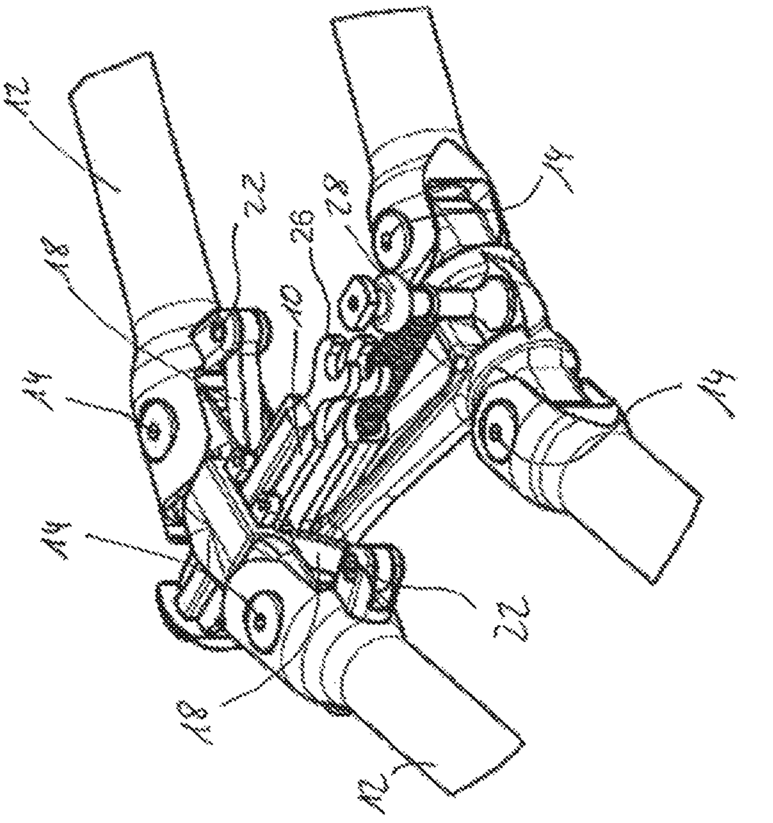

FIG. 6 depicts an enlarged section of the folding mechanism. The central element 8 with the slide 10 is visible, as well as the front two connection arms 12 on which the two levers 18 are situated. The first arm swivel axes 14 and the second lever swivel axes 22 can also be seen.

On the rear end of the slide is a gripper element 26, which is configured to at least partially encompass an end stop 28 when the slide 10 is situated on the end stop 28. In this case, the folding mechanism 6 is in the second position.

In FIG. 6, a spring element 20—also shown in FIG. 1—is particularly clear to see; this spring element is used to pre-tension the slide 10 towards the end stop 28.

Figure 7:
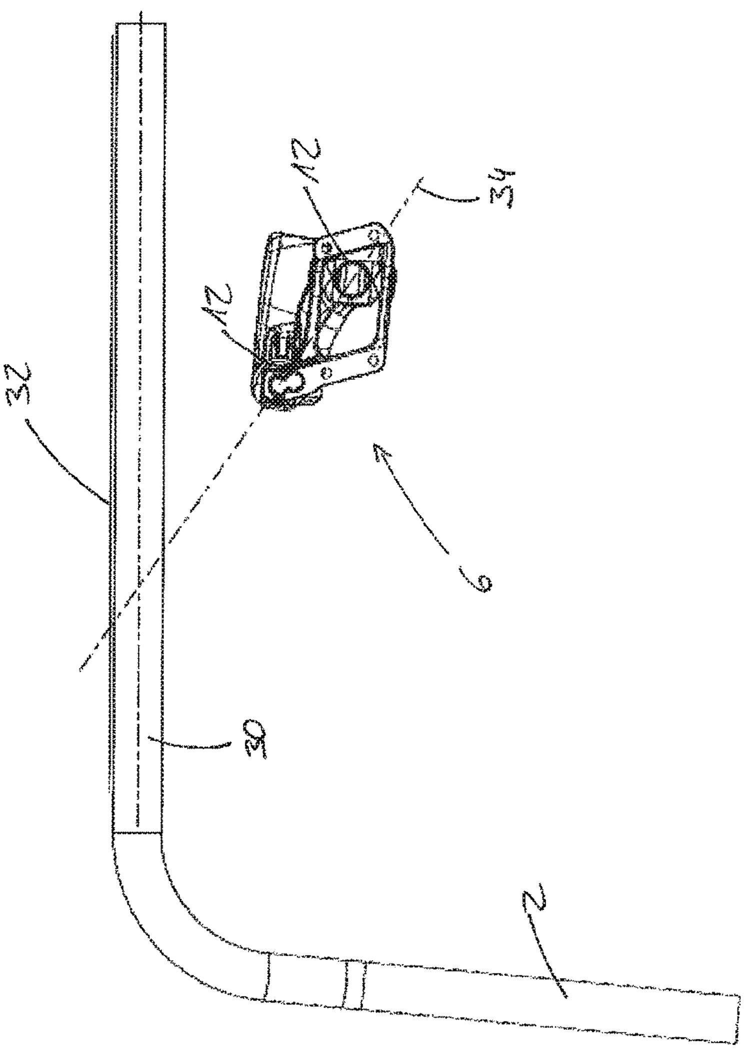

FIG. 7 shows a schematic representation of part of a mobility aid. The frame element 2 can be recognised, which has a horizontal part 30. A seating surface 32 is arranged on top of this which the user of the mobility aid sits when the mobility is in use. The folding mechanism 6 is represented underneath this, whereby it can be clearly seen that the different connection arms 12 are arranged at different heights relative to the seating surface 32, i.e. at different distances from the seating surface 32. In this position, the connection arms 12 span a connection plane, which is depicted as a dashed line. It can be recognised that this imaginary line 34 intersects the seating surface 32 in the front third of the seating surface 32. This is not necessary but is an advantage, as it improves the stability and also the sense of safety felt by a user of the mobility aid.

REFERENCE LIST

2 frame element
4 hollow axis
6 folding mechanism
8 central element
10 slide
12 connection arm

14 first arm swivel axis
16 second arm swivel axis
18 lever
20 first lever swivel axis
22 second lever swivel axis
24 grip element
26 gripper element
28 end stop
30 horizontal part
32 seating surface
34 connection arms

The invention claimed is:

1. A collapsible mobility aid, comprising:

two frame elements, on each of which at least one wheel is secured, or on each of which at least one wheel is to be secured;

a folding mechanism by which the frame elements are connected to each other and a distance between the frame elements in a first position of the folding mechanism is a transport distance and in a second position of the folding mechanism is a use distance;

wherein the folding mechanism has a central element with a movable slide, at least two connection arms which are articulated on a respective one of the frame elements and on the central element, and at least two levers which are articulated on a respective one of the connection arms and on the slide, and swivel axes, about which the at least two levers are arranged on the connection arms and the slide such that the at least two levers swivel relative to the connection arms and slide, and the swivel axes are on one plane when the folding mechanism is in the second position;

wherein the folding mechanism is pre-tensioned towards the second position with a spring element.

2. The collapsible mobility aid according to claim 1, wherein the swivel axes, about which the connection arms are arranged on the frame elements and the central element such that the connection arms swivel relative to the frame elements and the central element, and the connections arms are on one plane when the folding mechanism is in the second position.

3. The collapsible mobility aid according to claim 1, wherein the spring element is tensioned when the folding mechanism is brought out of the second position into the first position.

4. The collapsible mobility aid according to claim 1, wherein the folding mechanism is lockable in the first position by way of a locking device.

5. The collapsible mobility aid according to claim 1, further comprising an adjustable end stop arranged on one of the connection arms, a respective one of the frame elements fitting closely on the adjustable end stop when the folding mechanism is in the second position.

6. The collapsible mobility aid according to claim 1, wherein the central element comprises at least one end stop, the slide fitting closely on the at least one end stop when the folding mechanism is in the second position.

7. The collapsible mobility aid according to claim 1, wherein the slide comprises a grip element.

8. The collapsible mobility aid according to claim 1, wherein the folding mechanism comprises at least four connection arms, each of which is connected to one of the frame elements and to the central element.

9. The collapsible mobility aid according to claim 8, wherein the connection arms are movable within different planes as the connection arms move about the swivel axes from the second position to the first position.

10. A collapsible mobility aid, comprising:

first and second frame elements;

at least a first wheel secured to the first frame element;

at least a second wheel secured to the second frame element;

a folding mechanism connecting the frame elements to each other, the folding element having a first position that defines a transport distance between the first and second frame elements, and a second position that defines a use distance between the first and second frame elements, the folding mechanism in the second position being at a dead center wherein the folding mechanism is fixed from folding, the folding mechanism comprising:

a central element having a slide arranged moveably;

at least two connection arms which are articulated on a respective one of the frame elements and on the central element;

at least two levers which are articulated on a respective one of the connection arm and on the slide;

swivel axes about which the at least two levers are arranged on the connection arms and the slide such that the at least two levers swivel relative to the connection arms and slide, the swivel axes being on one plane when the folding mechanism is in the second position.

11. The collapsible mobility aid according to claim 10, wherein the swivel axes, about which the connection arms are arranged on the frame elements and the central element such that the connection arms swivel relative to the frame elements and the central element, and the connection arms are on one plane when the folding mechanism is in the second position.

12. The collapsible mobility aid according to claim 10, wherein the folding mechanism is pre-tensioned towards the second position with a spring element.

13. The collapsible mobility aid according to claim 12, wherein the spring element is tensioned when the folding mechanism is brought out of the second position into the first position.

14. The collapsible mobility aid according to claim 10, wherein the folding mechanism is lockable in the first position with a locking device.

15. The collapsible mobility aid according to claim 10, further comprising an adjustable end stop arranged on one of the connection arms, a respective one the frame elements fitting closely on the adjustable end stop when the folding mechanism is in the second position.

16. The collapsible mobility aid according to claim 10, wherein the central element comprises at least one end stop, the slide fitting closely on the at least one end stop when the folding mechanism is in the second position.

17. The collapsible mobility aid according to claim 10, wherein the slide comprises a grip element.

18. The collapsible mobility aid according to claim 10, wherein the folding mechanism comprises at least four connection arms, each of which is connected to one of the frame elements and to the central element.

19. The collapsible mobility aid according to claim 18, wherein the connection arms are movable within different planes as the connection arms move about the swivel axes.

* * * * *